United States Patent [19]
Fahn et al.

[11] Patent Number: 5,400,403
[45] Date of Patent: Mar. 21, 1995

[54] ABUSE-RESISTANT OBJECT DISTRIBUTION SYSTEM AND METHOD

[75] Inventors: Paul N. Fahn, Redwood City; Burton S. Kaliski, Jr., San Carlos; Matthew J. B. Robshaw, San Francisco, all of Calif.;; Paul N. Fahn, Redwood City, all of Calif.

[73] Assignee: RSA Data Security, Inc., Redwood City, Calif.

[21] Appl. No.: 106,979

[22] Filed: Aug. 16, 1993

[51] Int. Cl.$^6$ ............................................. H04L 9/08
[52] U.S. Cl. ......................................... 380/21; 380/4; 380/25
[58] Field of Search ...................... 380/21, 30, 4, 25

[56] References Cited

U.S. PATENT DOCUMENTS

| | | | |
|---|---|---|---|
| 4,200,770 | 4/1980 | Hellman et al. | 380/30 |
| 4,433,207 | 2/1984 | Best | 380/25 |
| 4,607,137 | 8/1986 | Jansen et al. | 380/21 |
| 4,658,093 | 4/1987 | Hellman | 380/30 |
| 4,683,553 | 7/1987 | Mollier | 380/25 |
| 4,683,968 | 8/1987 | Appelbaum et al. | 380/25 |
| 4,731,840 | 3/1988 | Mniszewski et al. | 380/21 |
| 4,757,534 | 7/1988 | Matyas et al. | 380/25 |
| 4,817,140 | 3/1989 | Chandra et al. | 380/25 |
| 4,888,798 | 12/1989 | Earnest | 380/25 |
| 4,907,273 | 3/1990 | Wiedemer | 380/5 |
| 5,010,571 | 4/1991 | Katznelson | 380/4 |
| 5,050,213 | 9/1991 | Shear | 380/25 |
| 5,058,162 | 10/1991 | Santon et al. | 380/25 |
| 5,146,498 | 9/1992 | Smith | 380/21 |
| 5,177,791 | 1/1993 | Yeh et al. | 380/21 |
| 5,179,591 | 1/1993 | Hardy et al. | 380/21 |
| 5,191,611 | 3/1993 | Lang | 380/25 |
| 5,230,020 | 7/1993 | Hardy et al. | 380/21 |
| 5,253,294 | 10/1993 | Maurer | 380/21 |
| 5,293,576 | 3/1994 | Mihm, Jr. et al. | 380/21 |
| 5,295,188 | 3/1994 | Wilson et al. | 380/30 |

OTHER PUBLICATIONS

Schnorr, "Efficient Identification and Signatures for Smart Cards", Advances in Cryptology-Crypto '89, pp. 239-251.

Brickell et al, "An Interactive Identification Scheme Based on Discrete Logarithms and Factoring", Journal of Cryptology, pp. 29-39.

Diffie et al, "New Directions in Cryptography", IEEE Transactions on Information Theory, vol. IT-22, No. 6, Nov. 1976, pp. 644-654.

Miller, "Use of Elliptic Curves in Cryptography", Advances in Cryptology-Crypto '85, pp. 417-426, New York, 1986.

Agnew et al, "Arithmetic Operations in $GF(2^m)$", Journal of Cryptology, pp. 3-13, 1993.

Rivest et al, "A Method for Obtaining Digital Signatures and Public-Key Cryptosystems", Communications of the ACM, 21(2), pp. 120-126.

Brickell et al, "Fast Exponentiation with Precomputation: Algorithms and Lower Bounds", Advances in Cryptology-Eurocrypt '92, pp. 1-24.

Odlyzko, "Discrete Logarithms in Finite Fields, and Their Cryptographic Significance", Advances in Cryptology-Eurocrypt '84, pp. 1-90, Berlin, 1984.

*Primary Examiner*—Salvatore Cangialosi
*Attorney, Agent, or Firm*—Nixon & Vanderhye

[57] ABSTRACT

Encrypted data objects are distributed via a broadcast communication channel or media. Relatively large access indicia may also be pre-distributed to any potential data object users and/or purchasers via an access communication channel or media. Subsequently, when a particular potential user or purchaser wishes to decrypt a given data object, he or she communicates to a data distribution point the identity of the desired data object and the identity of a valid access incidium. A relatively short decryption key is then furnished via a key distribution communication channel or media to permit decryption while at the same time permitting appropriate accounting operations to take place. The system is resistant to abuse in several ways but in part because such abuse would be approximately as difficult as would be re-distribution of the entire decrypted data object itself.

54 Claims, 4 Drawing Sheets

ABUSE-RESISTANT OBJECT DISTRIBUTION SYSTEM AND METHOD

BACKGROUND OF THE INVENTION

1. Field of the Invention

This invention relates to the distribution of encrypted data objects over a broadcast channel, specifically to a cryptographic mechanism for resisting the unauthorized access to such data objects.

A data object may be any discernible packet of useful information bearing indicia (e.g., machine readable media or signals representing computer programs, songs, music, data, news, and the like).

A broadcast channel is a communication channel in any media in which data objects are broadcast to many potential users rather than sent to each user individually, examples of which include laser discs, CD-ROM, diskettes, TV-cables, and radio broadcasts. In the case of laser discs, CD-ROM and diskettes, though the physical devices themselves might be sent to users individually, the data objects contained therein are identical for all users and therefore satisfy the definition of "broadcast."

2. Related Art

Ensuring that access to broadcast information is restricted to those who have the necessary authorization requires the use of cryptographic techniques.

Though data object distribution by broadcast suffers from many of the potential abuses of other forms of software distribution (e.g., see U.S. Pat. No. 4,658,093, "Software Distribution System" to Hellman, M., April 1987), the use of a broadcast channel introduces many new challenges. Among the most pressing is that of allowing an authorized user to decrypt an object and yet preventing the authorized user from passing on the knowledge of how to decrypt such objects to the benefit of some unauthorized user.

In many systems there is no absolute protection against the redistribution of decrypted objects (albeit there may be legal copyright protect the data object per se). However, we are also concerned about the distribution (e.g., on computer bulletin boards) of much shorter blocks of information than the objects themselves, this short information, perhaps the decryption key, allowing unauthorized access to one or more data objects.

Heretofore, attempted solutions to such problems have been provided by the predominant use of tamper-resistant hardware techniques (e.g., for storing decryption key data). See, for example:

U.S. Pat. No. 4,433,207, "Cryptographic Decoder for Computer Programs," February 1984

U.S. Pat. No. 4,683,553, "Method and Device for Protecting Software Delivered to a User by a Supplier," July 1987

U.S. Pat. No. 4,683,968, "System for Preventing Software Piracy Employing Multi-Encrypted Keys and Single Decryption Circuit Modules," August 1987

U.S. Pat. No. 4,817,140, "Software Protection System Using a Single-Key Cryptosystem, A Hardware-Based Authorization System and a Secure Co-Processor," March 1989

U.S. Pat. No. 4,907,273, "High Security Pay Television System," March 1990

U.S. Pat. No. 5,010,571, "Metering Retrieval of Encrypted Data Stored in Customer Data Retrieval Terminal," April 1991

U.S. Pat. No. 5,050,213, "Database Usage Metering and Protection System and Method," September 1991

U.S. Pat. No. 5,058,162, "Method of Distributing Computer Data Files," October 1991

U.S. Pat. No. 5,191,611, "Method and Apparatus for Protecting Material on Storage Media and for Transferring Material on Storage Media to Various Recipients," March 1993

Some of these prior attempted solutions require that the hardware unit on which decryption takes place has a unique cryptographic key attached (and securely retained therein). For example, in U.S. Pat. No. 4,433,207, such a key is referred to as a "permit code" and in U.S. Pat. No. 5,010,571 it is referred to as the "unit key." In U.S. Pat. No. 4,683,553, it is referred to as a "secret code." We refer to such a key that is unique to the decrypting unit as the unit key, though we shall only need this term when discussing the prior art.

The unit key is typically kept in a tamper-proof environment within the decrypting unit. Since the signal sent to the decrypting unit by the distributor can only be used by the specified decrypting unit, it is of no value to other users with different decryption units.

In other systems, a so-called "smart card" controls access to the data objects (see, e.g., U.S. Pat. No. 4,757,534, "Code Protection Using Cryptography," July 1988). Still others involve some form of run-time "software licensing" that does not necessarily encrypt data objects but which prevents their use on unauthorized computers (see, e.g., U.S. Pat. No. 4,888,798, "Modular Software Security," December 1989).

Among the drawbacks to prior systems are the following:

1. The decrypting unit contains some identifying information which must be kept secret from the user and only invoked when authorization to access the object is given. This information must be kept in a tamper-proof environment, something which is difficult to successfully implement, as evidenced by the problems with piracy experienced by cable TV systems that rely on such environments.
2. Each user is forced to possess dedicated, uniquely identifiable hardware. Thus, the great advantages of data distribution by a broadcast medium, that is, the cheap manufacturing and distribution costs, have been countered by the expensive manufacture and involved distribution of decrypting units.
3. Should the user compromise the physical security of the decrypting unit, the user can extract and then anonymously distribute decryption information. This then allows other users to gain unauthorized access to the encrypted objects via information much shorter than the objects themselves. Thus, not only has the system been compromised, but it is notoriously difficult to identify the offenders.

SUMMARY OF THE INVENTION

The solution we present with this invention relies on purely cryptographic techniques and does not require the use of secure decrypting units. Accordingly, several features of our invention are as follows:

1. Decryption units need contain no identifying information that must be kept secret. The entire decryption process can, if desired, be carried out using software, perhaps on the user's computer, without any additional hardware.
2. Each user may possess identical hardware. Thus the cost of the decrypting unit is reduced and the distribution of decrypting units is facilitated.
3. Redistribution of decryption information is no longer an issue. Since the decryption information is effectively as long as an object, a user may as well redistribute the object itself.
4. A large part of the decryption information is totally independent of the object and the user; only a small part is object-specific. The large part may therefore be distributed in advance by inexpensive means. The user decides later to access any specific object with the large part. The small additional part is then distributed to the user, e.g., by phone.
5. An ideal environment for a sophisticated billing procedure is provided which is directly related to the objects the user buys.

BRIEF DESCRIPTION OF THE DRAWINGS

These, as well as other objects and advantages of this invention, will be more completely understood and appreciated by careful study of the following more detailed description of presently preferred exemplary embodiments of the invention taken in conjunction with the accompanying drawings, of which.

DETAILED DESCRIPTION OF THE EXEMPLARY EMBODIMENTS

The reference numerals used in the FIGURES are briefly described below:

10) A publisher may act as the source of any desired data object (e.g., via keyboard entries, optical character recognition, reading of magnetic media or the like).

12) A distribution unit (e.g., a computer system) may receive and encrypt the data objects prior to distribution. The distribution unit also manufactures and publishes access numbers and, in the final stages of the process, provides remote terminals with the required decryption keys.

14) An access number channel may be any desired communication medium for the distribution of access numbers $A_i$ (e.g., diskettes offered in retail stores or by mail).

16) A broadcast channel may be any desired communication medium for the distribution of encrypted data objects $c_j$(e.g., laser discs, CD-ROM, diskettes offered in retail stores or by mail; TV-cables, radio broadcasts).

18) A user's terminal (e.g., a computer) may be used to access a data object $m_j$.

20) A key distribution channel may be any desired medium for two-way data communication between the terminal and the distribution unit. For FIGS. 2 and 7 this is abbreviated to "KDC."

22) Well known hardware or software implementation devices may be used to realize the encryption transformation $E_j$.

24) Well known hardware or software implementation devices may be used to realize the decryption transformation D.

26) Generator g is an element of $(Z^*_n)^m$ of order q.

28) Well known hardware or software implementation devices may be used to provide output $g^x \in (Z^*_n)^m$ when given g and x as inputs.

30) Pad number $\beta_j$ is an element of $(Z^*_n)^m$ RESULTING FROM EXPONENTIATION.

31) Element $\beta'_j$ of $(Z^*_n)^m$ which in the preferred embodiment is the same as $\beta_j$.

32) Data object $m_j$ may be in any desired machine readable format and media.

33) Recovered data object $m'_j$ which in the preferred embodiment is the same as $m_j$.

34) Well known hardware or software implementation devices may be used to realize a suitable random or pseudo-random number generator, denoted PRN.

36) Well known hardware or software implementation devices may be used to realize the combining function $f$ which combines the object $m_j$ and the pad number $\beta_j$ to give the encrypted data object $c_j$.

38) The encrypted data object $c_j$ is the encryption of data object $m_j$.

40) Access numbers $\alpha_i$ may be distributed to terminals via the access number channel.

42) A conventional memory media may be used to provide a store of $r_i$ that previously have been used to manufacture the access numbers.

44) A conventional memory media may be used by the distribution unit to provide a cross-referenced store of the i, j received from the terminal, the $t_{ij}$ that are returned to the terminal and the account information of the communicating terminal.

46) A conventional memory media may be used to provide a store of $s_j$ that previously have been used to manufacture the pad numbers.

48) Well known hardware or software implementation devices may be used to provide output (a-b) mod q when given a and b as inputs.

50) The decryption key $t_{ij}$ is sent by the distribution unit to the terminal via the key distribution channel.

52) Well known hardware or software implementation devices may provide the function $f'$ which combines the encrypted data object $c_j$ and pad number $\beta\ j$ to give the recovered data object $m'_j$.

54) Well known hardware or software implementation devices may be used to provide output ab in $(Z^*_n)^m$ when given a and b in $(Z^*_n)^m$ as inputs.

Figure 1:
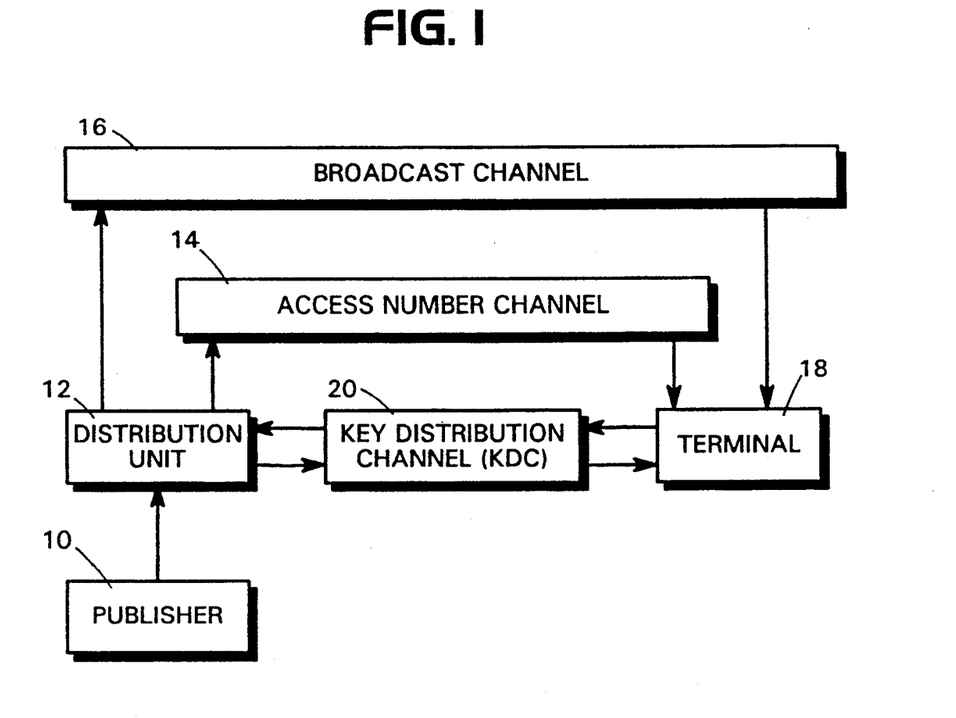
FIG. 1 depicts exemplary broadcast, key distribution and access number channels of communication that may be used in this invention.

Our invention is an abuse-resistant object distribution system. The objects may be distributed via a broadcast channel or any other desired type of mass sales or distribution technique. The necessary communications channels between the publisher, the distribution unit and the user's terminal are shown in FIG. 1 for an exemplary embodiment.

Figure 3:
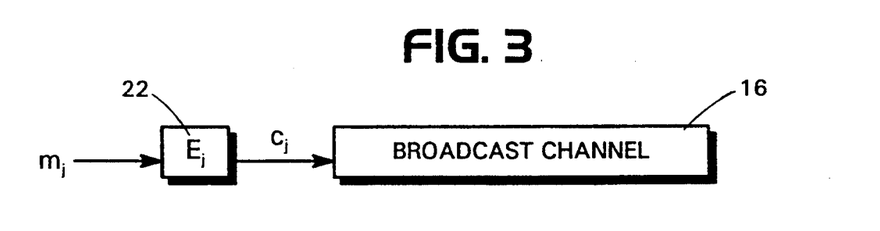
FIG. 3 depicts a general overview of an exemplary broadcast of data objects in accordance with this invention.
Figure 5:
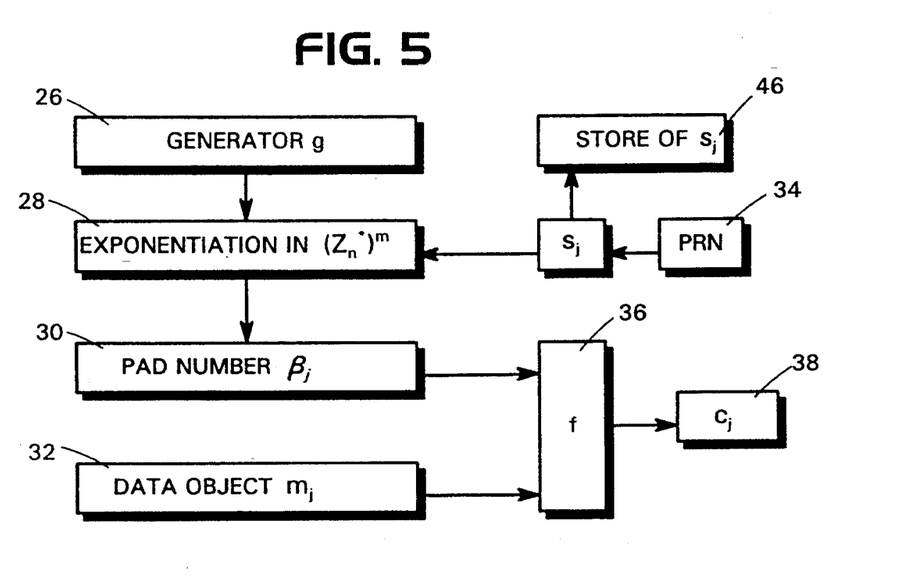
FIG. 5 depicts an exemplary method of encryption in the preferred embodiment.

Let the objects we wish to distribute be labelled $m_j$. Each object is uniquely encrypted prior to distribution to give $E_j(m_j) = c_j$. These encrypted objects are then readily available via the broadcast channel and anyone with access to the broadcast channel can receive $c_j$. See FIG. 3 and then FIG. 5 for a presently preferred encryption of $m_j$.

Independently of this process, access numbers $A_i$ are publicly distributed. This distribution might take place, for instance, using retail outlets or the conventional mail system. For the purposes of this document, we shall term any suitable means of distribution the access number channel. Clearly, we require that anyone wishing to receive object $m_j$ must be in a position to obtain some access number $A_i$. We emphasize that the choice of access number is totally independent of the choice of object. Any access number can be used to provide access to any object, though in the preferred embodiment, no access number can be used more than once.

When a user's terminal is in possession of both the encrypted object $c_j$ and an access number $A_i$, then contact is established with the distribution unit and permission is sought to decrypt $c_j$ using access number $A_i$. When permission to receive $m_j$ has been granted, perhaps in return for payment, the distribution unit sends a key $t_{ij}$ to the terminal which then computes $m'_j = D(A_i, t_{ij}, c_j)$, where D is a decryption function. The underlying mathematics and cryptography guarantees that, provided the correct $A_i$, $t_{ij}$ and $c_j$ have been used, $m'_j = m_j$. The value of the key $t_{ij}$ is dependent on both $A_i$ and $c_j$, but it can easily be calculated by the distribution unit for any encrypted object $c_j$ and any access number $A_i$.

Direct communication between the terminal and the distribution unit is carried out via the key distribution channel, which in practice, will be any convenient medium, although it is envisaged that this will most likely be a telephone line. The terminal then computes $D(A_i, t_{ij}, c_j)$ and recovers $m'_j = m_j$.

In the preferred embodiment, an access number $A_i$ can be predistributed independently of the identity of a user or terminal and independent of any data object later to be purchased or otherwise authorized for decryption. Each $A_i$ (and the associated pad number) is preferably too large for convenient re-distribution (e.g., substantially larger than 200 digits) for a typical data object having relatively limited intrinsic value. For example, it may be on the same order of size as the data object itself (e.g., 10,000 bytes or characters or more-or in excess of 100,000 bytes or characters) so that it is essentially just as convenient to re-distribute the decrypted data object itself if a user is so inclined. On the other hand, the decryption key $t_{ij}$ is preferably relatively small (e.g., the equivalent of no more than about 160 binary bits, i.e., 50 or less alphanumeric digits) so as to permit convenient transmission over a secure key distribution channel (e.g., a telephone voice circuit).

Figure 2:
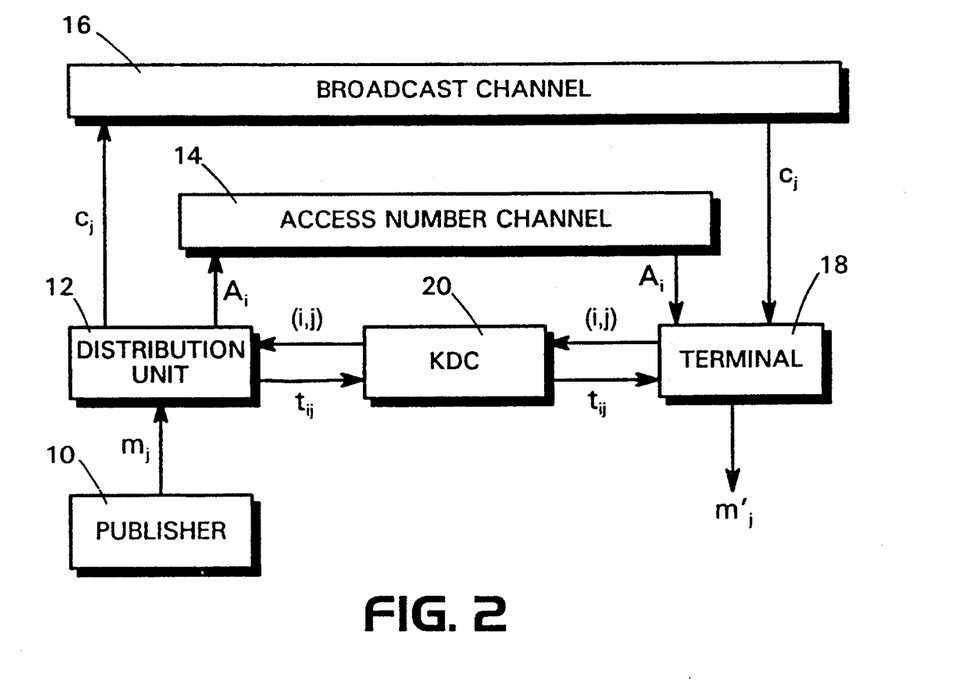
FIG. 2 further depicts communications that are sent in the environment depicted by FIG. 1.
Figure 4:
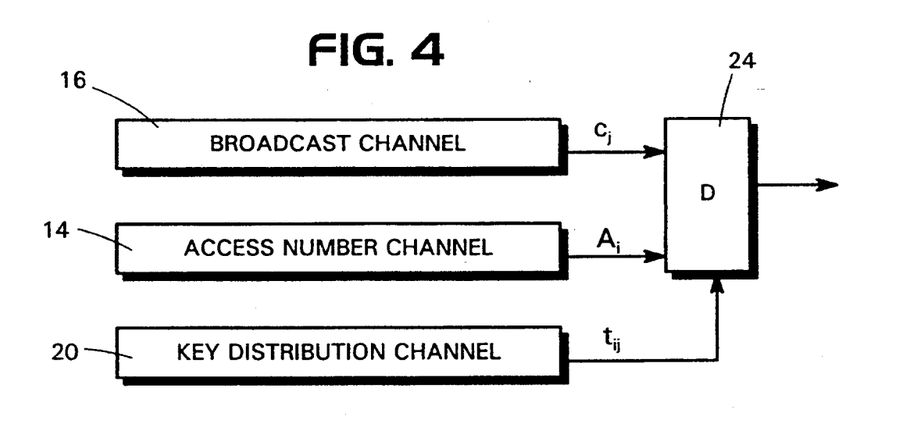
FIG. 4 depicts a general overview of an exemplary decryption of encrypted data objects in accordance with this invention.

The communications that may be sent through the various channels are shown in FIG. 2. For the decryption of $c_j$ see FIG. 4 and then FIG. 8 for a presently preferred embodiment.

As will be appreciated, cryptographic properties are contingent upon the choice of underlying mathematics. Under the current state of the art, we believe our preferred embodiment is secure, but there is nothing intrinsic in the overall system (i.e., absent an informed choice of underlying mathematics) that guarantees security.

Some cryptographic properties of the exemplary system more specifically described below guarantee the following. Any user not possessing the correct key $t_{ij}$ for both the chosen encrypted object $c_j$ and the chosen access number $A_i$, will be unable to decrypt $c_j$ regardless of any other information accumulated from other users that is more convenient to distribute than the object itself.

Some practical properties of the invention are as follows. Any access number $A_i$ can be used to construct a decryption key $t_{ij}$ to decrypt any $c_j$, though in the preferred embodiment, each $A_i$ can be used only once. The description of the key $t_{ij}$ is compact and particularly suitable for communication by means such as telephone. Finally, the calculation of $D(A_i, t_{ij}, c_j)$ is an efficient and straightforward process for the user's terminal.

The invention preferably uses a distribution unit to encrypt object $m_j$, provided by the publisher, using the encrypting transformation $E_j$. Additionally, the distribution unit must manufacture access numbers $A_i$.

In our presently preferred embodiment, the distribution unit chooses prime numbers n and q so that n-1 is divisible by q. Let g be an m-dimensional vector of multiplicative order q in the space $(Z^*_n)^m$. All operations such as multiplication and exponentiation are to be carried out component-wise.

The environment of this invention bears a similarity to that established in the Schnorr digital signature scheme (e.g., see "Efficient Identification and Signatures for Smart Cards," *Advances in Cryptology—CRYPTO '89* by C. P. Schnorr, pages 239–251, Springer-Verlag, N.Y., 1990), which has been adopted for the proposed Digital Signature Standard (e.g., see National Institute of Standards and Technology (NIST). Publication XX: *Announcement and specifications for a Digital Signature Standard* (DSS) (Aug. 19, 1992) and also an interactive identification scheme due to Brickell and McCurley (e.g., see "An Interactive Identification Scheme Based on Discrete Logarithms and Factoring," in *Journal of Cryptology* (1991) by E. F. Brickell and K. S. McCurley, Vol. 5, No. 1, pages 29–40, Springer-Verlag, N.Y.) Part of the security of this invention relies on the difficulty of computing discrete logarithms (e.g., see U.S. Pat. No. 4,200,770, *Cryptographic Apparatus and Method*, by M. Hellman, W. Diffie and R. Merkle, April 1980, "New Directions in Cryptography," *IEEE Transactions on Information Theory*, IT-22, pages 644–54, 1976, by W. Diffie and M. E. Hellman and "Discrete Logarithms in Finite Fields and Their Cryptographic Significance," in *Advances in Cryptology—Eurocrypt '84*, pages 224–314 (by A. Odlyzko), Berlin, 1984). This problem appears at present to be particularly difficult.

The distribution unit computes pad numbers $\beta_j$, one for each object. The pad number $B_j$ is a random power of the vector $g \in (Z^*_n)^m$ and is computed as $\beta = g^{s_j}$ mod n where $s_j$ is a random integer in the set $\{1, \ldots, q-1\}$.

Encryption is performed using a function $f$ so that $c_j = f(m_j, \beta_j)$. An example of such a function $f$ might be bit-wise addition modulo 2 (i.e., exclusive-OR) or integer addition. Decryption is performed using a related function $f'$ where $m_j = f'(c_j, \beta'_j)$ and $\beta'_j$ is a related pad number, which in the preferred embodiment equals $\beta_j$.

The encryption of $m_j$, $c_j$, is distributed via the broadcast channel. The generation of pad numbers and the encryption process for the preferred embodiment are presented in block diagram form in FIG. 5.

Figure 6:
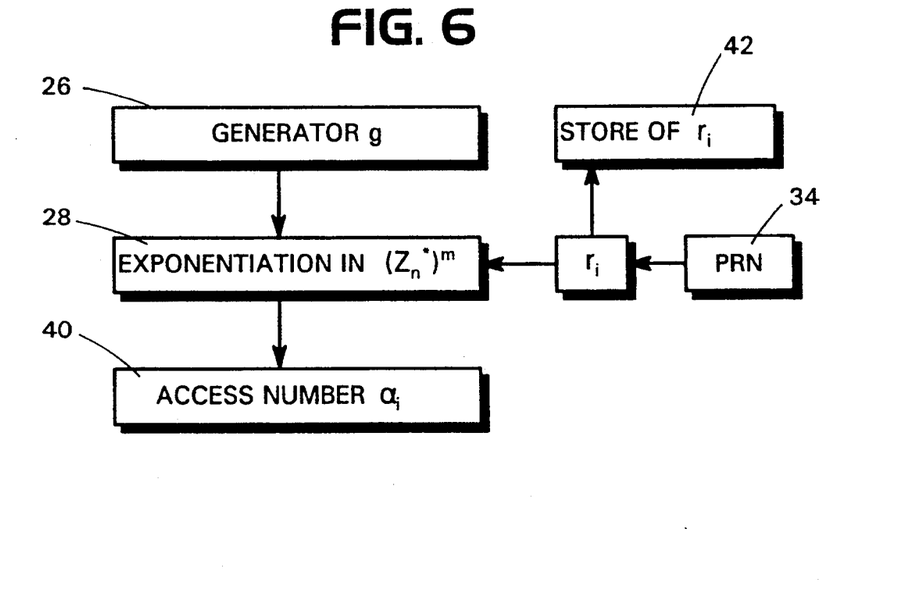
FIG. 6 depicts an exemplary generation of access numbers in a presently preferred embodiment of this invention.

Access numbers are calculated in a similar manner to the pad numbers. The access number $A_i$ is $\alpha_i$, which, like g and the pad numbers $\beta_j$, is an m-dimensional vector in $(Z^*_n)^m$. The access number $\alpha_i$ is a random power of the vector $g \in (Z^*_n)^m$ and is computed as $\alpha_i = g^{r_i} \mod n$ where $r_i$ is a random integer in the set $\{1, \ldots, q-1\}$. This process is represented in block diagram form in FIG. 6.

Access numbers are available to any terminal via the access number channel. They are not specific to the terminal or to the object that the terminal wishes to purchase.

Figure 7:
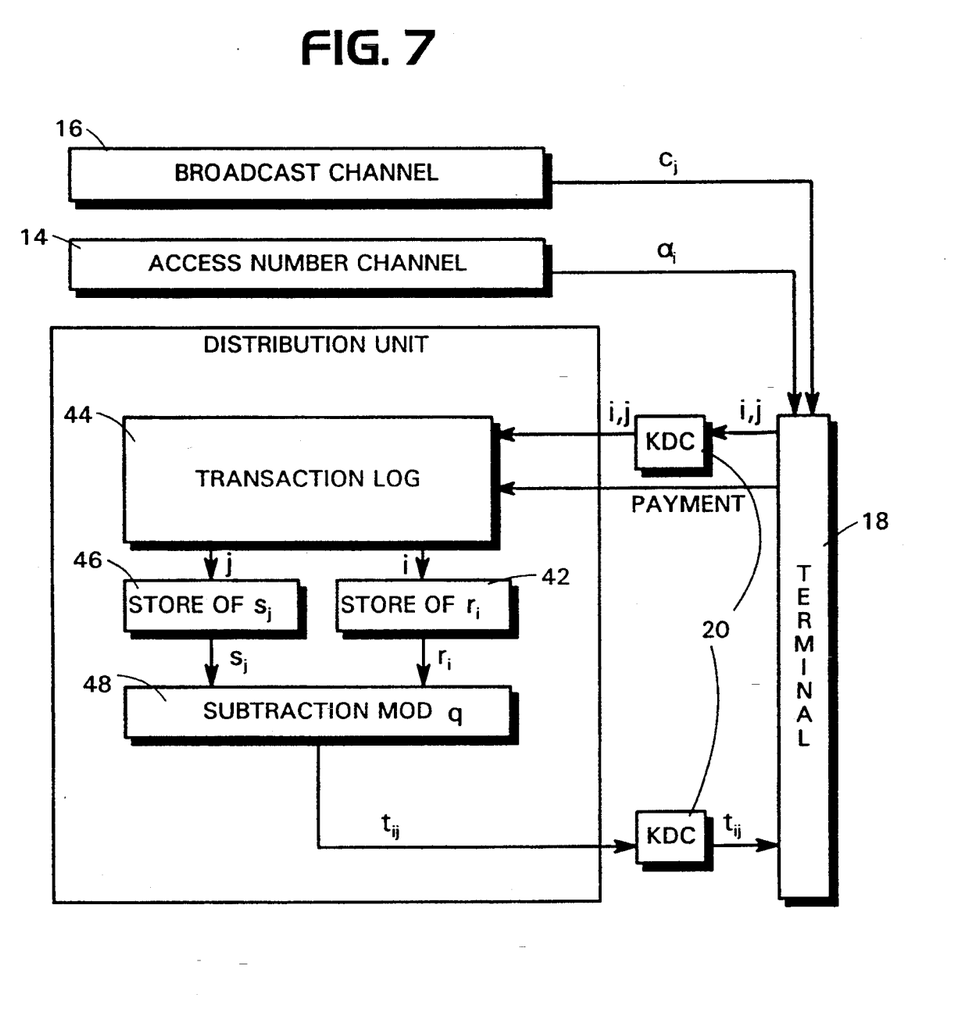
FIG. 7 depicts exemplary interaction between the user's terminal and the distribution unit and the calculation of the decryption keys in accordance with this invention.

Communication between the terminal and the distribution unit is two-way. The terminal informs the distribution unit, via the key distribution channel, that the user wishes to purchase object $m_j$ and possesses access number $\alpha_i$. The terminal sends the pair (i, j) to the distribution unit. The distribution unit responds by calculating the key $t_{ij}$. The distribution unit takes $r_i$ and $s_j$ from the store and calculates $t_{ij} = (s_j - r_i) \mod q$. Then $t_{ij}$ is sent back to the terminal via the key distribution channel. The distribution unit records the indices i and j and the user's payment information in the transaction log. The transaction log is used to check for the reuse of access numbers and may assist in other forms of accounting. The interaction between the terminal and the distribution unit for the preferred embodiment is represented in FIG. 7.

Figure 8:
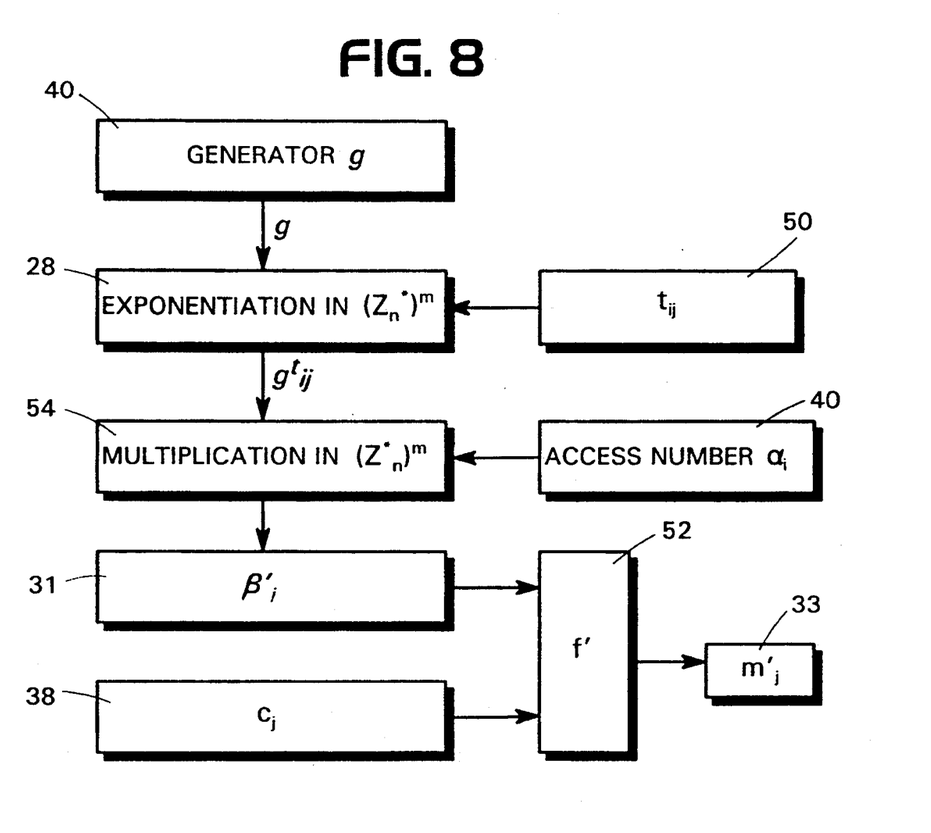
FIG. 8 depicts an exemplary method of decryption for a presently preferred embodiment of this invention.

Decryption of the encrypted object by the terminal can now take place as follows. The procedure for the preferred embodiment is represented in block diagram form in FIG. 8. Firstly, the terminal calculates $\beta'_j = \alpha_i g^{t_{ij}} \mod n$ which equals $\beta_j$:

$$\beta'_j = \alpha_i g^{t_{ij}} = (g_1^{r_i}, \ldots, g_m^{r_i}) \times (g_1, \ldots, g_m)^{(s_j - r_i)}$$
$$= (g_1^{s_j}, \ldots, g_m^{s_j}) = \beta_j$$

Then the terminal recovers $m'_j$ with $f'$, where the underlying cryptographic mathematics guarantees that $m'_j = m_j$:

$$m'_j = f'(c_j, \beta'_j) = m_j$$

The security of our presently preferred embodiment, as well as many other related systems contemplated in this invention, depends on the discrete logarithm problem: Given y, n and g, find x such that $y = g^x \mod n$. (The problem generalizes component-wise to the multi-dimensional case.) For typical system parameters, it would take thousands of years or more on powerful computer workstations to solve the problem with known methods. Determining a key $t_{ij}$ without the help of the distribution unit is therefore impractical with known methods.

In the presently preferred embodiment, it is important that each access number be used only once. A user who obtains two keys with the same access number— for instance, keys $t_{ij}$ and $t_{ij'}$,—can determine the difference $\delta_{jj'} = t_{ij'} - t_{ij} = s_{j'} - s_j$. Given that difference, another user who obtains a key $t_{i'j}$ can determine $t_{i'j'} = t_{i'j} + \delta_{jj'}$. As long as each access number is used only once, however, no such attack is possible.

Since the access numbers are the same length as the pad numbers and the objects, redistribution of decryption information is not an issue. The user may as well redistribute the objects themselves, an abuse to which all broadcast systems in which a user may access objects are vulnerable.

Although the access numbers are as long as the objects, they are totally independent of the objects and therefore may be distributed in advance through the access number channel. An access number can be used to decrypt any object, so the user can collect access numbers, deciding later which objects to purchase. Only the key $t_{ij}$ is specific to an object, and it is distributed at the time of purchase through the key distribution channel.

Thus, this invention offers a mechanism for the abuse-resistant broadcast of data objects.

The reader will see that the abuse-resistant object distribution system in the invention provides a flexible and secure solution to the pressing problem of limiting unauthorized access to data objects. This invention does not require the use of secure hardware, as demanded by the prior art, and thus represents a new and alternative approach to that offered by current solutions.

One example of a system in accordance with our invention may include the following parameters:

1. n, a 576-bit prime integer;
2. q, a 160-bit prime integer dividing n−1; and
3. $g_1, \ldots, g_{200}$, 200 elements of order q in the multiplicative group modulo n.
4. The values $r_i$, $s_j$ and $t_{ij}$ may be 160-bit integers, where $t_{ij} = s_j - r_i \mod q$.
5. The access number $\alpha_i$ may be a 200-dimensional vector $(\alpha_{i,1}, \ldots, \alpha_{i,200})$ where $\alpha_{i,k} = g_k^{r_i} \mod n$.
6. The pad number $\beta_j$ may be 200-dimensional vector $(\beta_{j,1}, \ldots, \beta_{j,200})$ where $\beta_{j,k} = g_k^{s_j} \mod n$.
7. Objects may be encryted and decryted by exclusive-OR: $c_j = m_j \oplus \beta_j$ and $m_j = c_j \oplus \beta_j$.

The distribution unit may be a network of personal computers, such as IBM PC-compatible workstations (e.g., 33 MHz '486 machines) on a Novell NetWare network. Through the network, the workstations may share data files. The network may also include equipment for "minting" CD-ROM disks, a tape drive, 3-½" or 5-¼" diskette drives, and a hardware random-number generator such as one manufactured by Newbridge Microsystems. All of this equipment is commonly and widely available today.

The distribution unit may run six software applications:

1. System setup which generates system parameters n, q and $g_1, \ldots, g_{200}$ with random-number generator as input.
2. Object encryption which reads an object $m_j$ and its index j from magnetic tape supplied by the publisher. It generates a value $s_j$ with the random-number generator and input, computes a pad number $\beta_j$ from the $s_j$ value, and writes the $s_j$ value and the index j to a network file. Then it exclusive-ORs the object $m_j$ with the pad number $\beta_j$ and writes the resulting encrypted object $c_j$ and its index j to a network file. (The object must be no longer than the pad $\beta_j$. If it is shorter, then only part of the pad is needed. Longer objects may be handled in two or more parts).

3. Object distribution which "mints" identical CD-ROM disks from groups of encrypted objects and their indices. The CD-ROM disks would be distributed by mail or through software stores.
4. Access number generation which generates a value $r_i$ with the random-number generator as input, computes an access number $\beta_i$ from the $r_i$ value, writes the $r_i$ value and the index i to one network file, and writes the $\beta_i$ value and the index i to another network file.
5. Access number distribution which copies groups of access numbers and their indices to unique diskettes. The diskettes would be distributed by mail or through software stores.
6. Key distribution which reads indices, i and j and other account information such as name and form of payment from a computer keyboard. It reads a network file to check whether the index i is already used. If so, it writes a warning to a computer monitor. If not, it reads the indexed $r_i$ and $s_j$ values from their respective data files, computes the key $t_{ij}$, and writes the key to a computer monitor. It also writes the account information and the indices i and j to a network file for accounting. The application may also handle billing functions.

The application's operator would obtain the indices and the account information from a user over the telephone, then give the key to the user.

Techniques for generating the system parameters, computing the pad number and access number, and encrypting the object are widely known in the field of cryptography. Conventional software such as BigNum from Digital Equipment Corporations' Paris Research Laboratories can assist in the multiple-precision arithmetic; special hardware is also available.

Methods involving off-line precomputation can speed up the computation of pad numbers and access numbers significantly (see, e.g., "Fast exponentiation with precomputation," Algorithms and Lower Bounds in *Advances in Cryptology-EUROCRYPT '92*, by E. F. Brickell, D. M. Gordon, K. S. McCurley and D. B. Wilson, pages 1–24, Springer-Verlag, N.Y., Mar. 12, 1992).

The other steps involve conventional programming techniques. In particular, a programmable database management program is easily customized to support the key distribution and tracking applications.

The terminal may be a personal computer (e.g., a 33 MHz '486 machine). It may be on a network but need not be. The computer may have a CD-ROM reader and a disk drive. All of this is commonly and widely available today.

The terminal may run one application: object decryption which reads an encrypted object $c_j$ of the user's choice and its index j from a CD-ROM disk, reads an unused access number $\alpha_i$ and its index i from a diskette, and writes the indices i and j to the computer screen. It reads the key $t_{ij}$ (supplied to the user via telephone) from the computer keyboard, computes the pad number $\beta_j$, exclusive-ORs the encrypted object $c_j$ with the pad number $\beta_j$ and writes the resulting data object $m_j$ to the computer disk.

The user would obtain the key from a distribution unit operator over the telephone, having first given the indices and account information.

Techniques for computing the pad number and decrypting the object are widely known in the field of cryptography as already mentioned in the description of the exemplary distribution unit. The other steps involve conventional programming techniques.

While the above description contains many specificities, these should not be construed as limitations on the scope of the invention, but rather as exemplifications of a preferred embodiment thereof.

Many other variations are possible. These variations may provide different settings for the scheme, each offering different enhancements in security and/or performance. Changing the group from which the access numbers and pad numbers are taken, and changing the group operation used to combine them are among possible extensions. An example of this might be the use of elliptic curves (e.g., see "Use of Elliptic Curves in Cryptography," in *Advances in Cryptology-Crypto '85*, by V. S. Miller, Pages 417–26, New York, 1986). Another example is a finite field of characteristic 2 (e.g., "Arithmetic operations in GF($2^m$)" in *Journal of Cryptology*, by G. B. Agnew, T. Beth, R. C. Mullin and S. A. Vanstone, Vol. 6, No. 1, pages 3–13, 1993).

As another extension, one may choose the access numbers and pad numbers from a subset of a group, rather than from a subgroup. This may have further implementation advantages. One may also choose the generator g with special characteristics that facilitate implementation. Also, one may invovle several access numbers in the process of computing a pad number at the terminal, in an effort to improve performance. Other extensions might well allow some limited reuse of the access numbers without any degradation to the security of the system.

In addition, the modulus n could be a composite number, which may offer additional security in some embodiments. (See, e.g., U.S. Pat. No. 4,405,829 *Cryptographic Communications System and Method*, R. L. Rivest, A. Shamir and L. M. Adleman, September 1983 and "A Method for Obtaining Digital Signature Schemes and Public-Key Cryptosystems," in *Communications of the ACM*, 21(2), by R. L. Rivest, A. Shamir and L. Adleman, pages 120–26, February 1978).

It is possible that only critical parts of a data object may be encrypted, or that multiple data objects may be encrypted the same way, to give two more variations.

Another extension involves the pre-distribution of keys. The distribution unit transmits some of the $t_{ij}$'s encrypted using a shorter encryption key. The shorter key used for decrypting $t_{ij}$ would then be returned in response to the request to receive object $m_j$ using access number $A_i$. Thus, the amount of communication on the key distribution channel can be reduced.

It should not be construed that the system is limited to distributing only the information already described. For instance, one could also distribute unencrypted software through the broadcast channel, e.g., the terminal's object decryption application. One could also pre-distribute certain precomputed values that speed up the terminal's computation through the access number or broadcast channel.

The entire contents of each above-referenced publications or patent documents are hereby incorporated by reference.

Other variations and modifications to the exemplary embodiment(s) will be apparent to those skilled in the art while yet retaining some or all of the novel features and advantages of this invention. All such variations and modifications are intended to be included within the scope of the appended claims.

What is claimed is:

1. A data distribution unit including electronic signal processing circuits comprising:
   a source of data signals $m_j$;
   an access indicia generator means providing access indicia signals $A_i$ for selected distribution to potential users over an access channel;
   a data encryptor means providing encrypted data signals $c_j = E_j(m_j)$ for broadcast distribution to potential users over a broadcast channel where $E_j$ is a predetermined encryption signal processing function; and
   a decryption key generator means coupled to said encryptor means and to said access indicia generator means and providing unique keys data signals $t_{ij}$ for selected distribution to an authorized user over a key channel such that $m_j = D(A_i, t_{ij}, c_j)$ where D is a predetermined decryption signal processing function for decrypting data signals encrypted with the predetermined signal processing function $E_j$.

2. A data distribution unit as in claim 1 further comprising:
   a storage medium means containing a record of previously used access indicia signal $A_i$ for checking for reuse of such previously used indicia signals.

3. A data distribution unit as in claim 1 wherein each access indicium signal $A_i$ includes a number of characters or bytes that exceeds two hundred.

4. A data distribution unit as in claim 3 wherein each access indicium signal $A_i$ includes a number of characters or bytes that exceeds ten thousand.

5. A data distribution unit as in claim 1, 2, 3, or 4 wherein each key signal $t_{ij}$ is represented by less than 200 binary bits.

6. A terminal for receiving broadcast encrypted data signals $c_j$ via a broadcast channel and encrypted by a predetermined encrypting signal processing function $E_j(m_j) = c_j$ and for selectively decrypting such data signals, said terminal comprising:
   means for receiving at least one access indicium signal $A_i$ received via an access channel; and
   a decryptor means adapted to receive a unique decryption key signal $t_{ij}$ based on a selected signal $A_i$ and a selected signal $c_j$ via a key channel and to provide a decryption signal $m_j$ of the selected encrypted data.

7. A terminal as in claim 6 wherein each access indicium signal $A_i$ includes a number of characters or bytes that exceeds two hundred.

8. A terminal as in claim 7 wherein each access indicium signal $A_i$ includes a number of characters or bytes that exceeds ten thousand.

9. A terminal as in claim 6 wherein each key signal $t_{ij}$ is represented by less than 200 binary bits.

10. A terminal as in claim 6 wherein said key signal $t_{ij}$ is accessible to a user of said terminal.

11. A data distribution system comprising:
    a plurality of data signal receiving terminals;
    at least one data signal distribution unit coupled to said plurality of data signal receiving terminals by a data signal object broadcast channel providing encrypted data signal objects $c_j$ to each terminal;
    an access channel providing a unique access indicium signal $A_i$ to any terminal desiring access to said data signal objects; and
    a key signal distribution channel for providing a unique decryption key signal $t_{ij}$ to any requesting terminal from a distribution unit corresponding to supplied indicium signal $A_i$ and a selected encrypted data signal object $c_j$ and for decrypting signal $c_j$.

12. A data distribution system as in claim 11 further comprising:
    data signal storage means maintaining a record of previously used $A_i$ for checking for reuse of such $A_i$.

13. A data distribution system as in claim 11 wherein each access indicium signal $A_i$ includes a number of characters or bytes that exceeds two hundred.

14. A data distribution system as in claim 13 wherein each access indicium signal $A_i$ includes a number of characters or bytes that exceeds ten thousand.

15. A data distribution system as in claim 11 wherein each key signal $t_{ij}$ is represented by less than 200 binary bits.

16. A data distribution system comprising:
    a source of data signals $m_j$;
    an access indicia generator providing access indicia signals $A_i$;
    a data encryptor providing encrypted data signals $c_j = E_j(m_j)$ where $E_j$ is a predetermined encryption signal processing function; and
    a decryption key generator coupled to said encryptor and to said access indicia generator and providing unique key signals $t_{ij}$ such that data signals $m_j = D(A_i, t_{ij}, c_j)$ where D is a predetermined decryption signal processing function for decrypting data encrypted with the predetermined signal processing function $E_j$;
    a plurality of terminals coupled to receive said data signals $c_j$; and
    each said terminal including a decryptor means adapted to receive a decryption key signal $t_{ij}$ based on a supplied signal $A_i$ and a selected signal $c_j$ and to provide a decryption signal $m'_j$ of the selected encrypted data.

17. Apparatus as in claim 1, 6, 11 or 16 wherein signal $A_i$ represents an element of a group of signals, and
    (a) the signal processing function $E_j$ is $$E_j(m_j) = f(B_j, m_j),$$

where $f$ is a signal processing function and signal $B_j$ represents an element of a group of signals, and
    (b) the signal processing function D is $$D(A_i, t_{ij}, c_j) = f'(A_i, c_j),$$

where $f'$ is a signal processing function and $A_i$ denotes the $t_{ij}$th power of signal $A_i$ in the group of signals.

18. Apparatus as in claim 1, 6, 11 or 16 wherein signal $A_i$ represents an element of a group of signals, and
    (a) the signal processing function $E_j$ is $$E_j(m_j) = f(B_j, m_j)$$

where $f$ is a signal processing function and signal $B_j$ represents an element of a group of signals, and
    (b) the signal processing function D is $$D(A_i, t_{ij}, c_j) = f'(G \circ A_i, c_j)$$

where $f'$ is a signal processing function, G denotes the $t_{ij}$th power of signal G in the group of signals, G represents an element of the group, and o denotes a group signal processing operation.

19. Apparatus as in claim 17 wherein the group of signals is a subgroup of order q of the multidimensional multiplicative group modulo n, where n and q are integers, and hence where signals $A_i$ and $B_j$ represent vectors $\alpha_i$ and $\beta_j$ and the $t_{ij}$th power of $\alpha_i$ is $(\alpha a_{i1}{}^{t_{ij}} \bmod n, \ldots, a_{im}{}^{t_{ij}} \bmod n)$, where $\alpha_{i1}, \ldots, \alpha_{im}$ are the components of $\alpha_i$, and m is the dimension.

20. Apparatus as in claim 17 including means for implementing the signal processing functions $f$ and $f'$ by bit-wise exclusive-or signal processing functions.

21. Apparatus as in claim 1, 6, 11 or 16 wherein:
signal $t_{ij}$ is transformed into an encrypted key signal under a key-encryption key signal shorter than $t_{ij}$ and transmitted from a distribution unit to a terminal over a communication channel that is different than that used to communicate signal $c_j$ but the same as is used to communicate signal $A_i$, said key-encryption key signal being communicated on the same communication channel as is signal $t_{ij}$.

22. A data object distribution system, comprising
(a) a broadcast channel for transmitting identical encrypted signals representing data objects from a distribution unit to a plurality of terminals;
(b) an access number channel for transmitting a unique access number signal from said distribution unit to any one of said terminals,
(c) a key distribution channel for transmitting signals representing indexes of an encrypted data object signal and of an access number signal from any one of said terminals to said distribution unit and for transmitting a key signal from the distribution unit to said one terminal which, in combination with the access number signal enables access to the data object,
(d) a distribution unit means coupled to said broadcast channel, said access number channel, and said key distribution channel, and adapted for
  i. generating an access number signal $A_i$, where i is the index of the access number signal,
  ii. transmitting signal $A_i$ on said access number channel,
  iii. transforming a data object signal $m_j$ into an encrypted data object signal $c_j$, where j is the index of the data object signal, $c_j = E_j(m_j)$, and $E_j$ is a signal processing function,
  iv. transmitting signal $c_j$ on said broadcast channel,
  v. computing a key signal $t_{ij}$ such that $m_j = D(A_i, t_{ij}, c_j)$, where D is a signal processing function,
  vi. receiving signals representing index numbers i and j from said key distribution channel, and
  vii. transmitting signal $t_{ij}$ on said key distribution channel, and
(e) a plurality of terminal means, each terminal means being coupled to said broadcast channel, said access number channel, and said key distribution channel, and adapted for
  i. receiving signal $c_j$ from said broadcast channel,
  ii. receiving signal $A_i$ from said access number channel,
  iii. transmitting signals representing i and j on said key distribution channel, and
  iv. transforming signal $c_j$ into a data object signal $m'_j$, where $m'_j = D(A_i, t_{ij}, c_j)$.

23. The system as in claim 22 wherein signal $A_i$ represents an element of a group of signals,
  (a) the signal processing function $E_j$ is $E_j(m_j) = f(B_j, m_j)$, where $f$ is a signal processing function and signal $B_j$ represents an elements of a groups of signals, and
  (b) the signal processing function D is $D(A_i, t_{ij}, c_j) = f'(A_i, c_j)$, where $f'$ is a signal processing function and $A_i$ denotes the $t_{ij}$th the power of signal $A_i$ in the group of signals.

24. The system as in claim 22 wherein signal $A_i$ represents an element of a group of signals, and
  (a) the signal processing function $E_j$ is $E_j(m_j) = f(B_j, m_j)$ where $f$ is a signal processing function signal $B_j$ represents an element of a group of signal, and
  (b) the signal processing function D is $D(A_i, t_{ij}, c_j) = f'(G \circ A_i, c_j)$ where $f'$ is a signal processing function, G denotes the $t_{ij}$th power of signal G in the group of signals, G represents an element of the group of signals, and o denotes a group signal processing operation.

25. The system as in claim 23 or 24 wherein the group of signals is a subgroup of order q of the multidimensional multiplicative group modulo n where n and q are integers, and hence where signals $A_i$ and $B_j$ represent vectors $\alpha_i$ and $\beta_j$, and the $t_{ij}$th power of $\alpha_i$ is $(\alpha_{i1}{}^{t_{ij}} \bmod n, \ldots, \alpha_{im}{}^{t_{ij}} \bmod n)$, where $\alpha_{i1}, \ldots, \alpha_{im}$ are the components of $\alpha_i$ and m is the dimension.

26. The system as in claim 23 or 24 including means for implementing the signal processing functions $f$ and $f'$ by bit-wise exclusive-or signal processing functions.

27. The system as in claim 22, 23, or 24 wherein
  (a) the distribution unit means is further adapted for
    i. transforming signal $t_{ij}$ into an encrypted key signal under a key-encryption key signal shorter than signal $t_{ij}$ and transmitting said encrypted key signal on the access number channel, whereby the distribution unit may predistribute said encrypted key signal, and
    ii. transmitting said key-encryption key signal on the key distribution channel, and
  (b) the terminal means is further adapted for
    i. receiving said encrypted key signal from the access number channel,
    ii. receiving said key-encryption key signal from the key distribution channel, and
    iii. transforming said encrypted key signal into a key signal $t'_{ij}$ under said key-encryption key signal.

28. A data distribution method comprising:
providing a source of data signals $m_j$;

providing access indicia signals $A_i$ for selected distribution to potential users over an access channel;

providing encrypted data signals $c_j = E_j(m_j)$ for broadcast distribution to potential users over a broadcast channel where $E_j$ is a predetermined encryption signal processing function; and providing unique key data signals $t_{ij}$ for selected distribution to an authorized user over a key channel such that $m_j = D(A_i, t_{ij}, c_j)$ where D is a predetermined decryption signal processing function for decrypting data encrypted with the predetermined signal processing function $E_j$.

29. A data distribution method as in claim 28 further comprising:

recording previously used access indicia signals $A_i$ in a storage medium for checking for reuse of such previously used indicia signals.

30. A data distribution method as in claim 28 wherein each access indicium signal $A_i$ includes a number of characters or bytes that exceeds two hundred.

31. A data distribution method as in claim 30 wherein each access indicium signal $A_i$ includes a number of characters or bytes that exceeds ten thousand.

32. A data distribution method as in claims 28, 29, 30 or 31 wherein each key signal $t_{ij}$ is represented by less than 200 binary bits.

33. A method for receiving broadcast encrypted data signals $c_j$ via a broadcast channel and encrypted by a predetermined encrypting signal processing function $E_j(m_j) = c_j$ and for selectively decrypting such data, said method comprising:

providing at least one access indicium signal $A_i$ received via an access channel; and receiving a unique decryption key signal $t_{ij}$ based on a selected signal $A_i$ and a selected signal $c_j$ via a key channel and providing a decryption signal $m_j$ of the selected encrypted data.

34. A method as in claim 33 wherein each access indicium signal $A_i$ includes a number of characters or bytes that exceeds two hundred.

35. A method as in claim 33 wherein each access indicium signal $A_i$ includes a number of characters or bytes that exceeds ten thousand.

36. A method as in claim 33 wherein each key signal $t_{ij}$ is represented by less than 200 binary bits.

37. A method as in claim 34 wherein said key signal $t_{ij}$ is accessible to a user of said terminal.

38. A data distribution method comprising:

providing a plurality of data receiving terminals;

providing encrypted signals representing data objects $c_j$ to each terminal via a data object broadcast channel;

providing a unique access indicium signal $A_i$ to any terminal desiring access to said data objects via an access channel; and providing a unique decryption key signal $t_{ij}$ via a key distribution channel to any requesting terminal corresponding to a supplied indicium signal $A_i$ and a selected encrypted data object signal $c_j$ and for decrypting signal $c_j$.

39. A data distribution method as in claim 38 further comprising:

maintaining a record of previously used signal $A_i$ for checking for reuse of such signals $A_i$.

40. A data distribution method as in claim 38 wherein each access indicium signal $A_i$ includes a number of characters or bytes that exceeds two hundred.

41. A data distribution method as in claim 40 wherein each access indicium signal $A_i$ includes a number of characters or bytes that exceeds ten thousand.

42. A data distribution method as in claim 38 wherein each key signal $t_{ij}$ is represented by less than 200 binary bits.

43. A data distribution method comprising:

providing a source of data signal $m_j$;

providing access indicia signal $A_i$;

providing encrypted data signal $c_j = E_j(m_j)$ where $E_j$ is a predetermined encryption signal processing function; and providing unique key signals $t_{ij}$ such that $m_j = D(A_i, t_{ij}, c_j)$ where D is a predetermined decryption signal processing function for decrypting data encrypted with the predetermined signal processing function $E_j$;

providing a plurality of terminals coupled to receive said signal $c_j$; and providing a decryptor in each terminal adapted to receive a decryption key signal $t_{ij}$ based on a supplied signal $A_i$ and a selected signal $c_j$ and to provide a decryption signal $m'_j$ of the selected encrypted data.

44. Method as in claim 28, 33, 38 or 43 where signal $A_i$ represents an element of a group of signals, and (a) the signal processing function $E_j$ is $$E_j(m_j) = f(B_j, m_j),$$

where $f$ is a signal processing function and $B_j$ represents an element of a group of signals, and (b) the signal processing function D is $$D(A_i, t_{ij}, c_j) = f'(A_i, c_j),$$

where $f'$ is a signal processing function and $A_i$ denotes the $t_{ij}$th power of signal $A_i$ in the group of signals.

45. Method as in claim 28, 33, 38 or 43 wherein $A_i$ represents an element of a group of signals, and (a) the signal processing function $E_j$ is $$E_j(m_j) = f(B_j, m_j)$$

where $f$ is a signal processing function $B_j$ represents an element of a group of signals, and (b) the signal processing function D is $$D(A_i, t_{ij}, c_j) = f'(G \circ A_i, c_j)$$

where $f'$ is a signal processing function, G denotes the $t_{ij}$th power of G in the group of signals, G represents an element of the group of signals, and $\circ$ denotes a group signal processing operation.

46. Method as in claim 44 wherein the group of signals is a subgroup of order q of the multidimensional multiplicative group modulo n, where n and q are integers, and hence where signals $A_i$ and $B_j$ represent vectors $\alpha_i$ and $\beta_j$ and the $t_{ij}$th power of $\alpha_i$ is $(\alpha_{i1}{}^{t_{ij}} \bmod n, \ldots, \alpha_{im}{}^{t_{ij}} \bmod n)$, where $\alpha_{i1} \ldots, \alpha_{im}$ are the components of $\alpha_i$, and m is the dimension.

47. Method as in claim 44 wherein the signal processing functions $f$ and $f'$ include bit-wise exclusive-or processing of signals.

48. Method as in claim 28, 33, 38 or 43 wherein:

signal $t_{ij}$ is transformed into an encrypted key signal under a key-encryption key signal shorter than signal $t_{ij}$ and transmitted from a distribution unit to a terminal over a communication channel that is different than that used to communicate signal $c_j$ but the same as is used to communicate signal $A_i$, said key-encryption key being communicated on the same communication channel as is signal $t_{ij}$.

49. A data object distribution method, comprising
   (a) transmitting identical encrypted signals representing data objects from a distribution unit via a broadcast channel to a plurality of terminals;
   (b) transmitting a unique access number signal from said distribution unit to any one of said terminals via an access number channel,
   (c) transmitting index signals of an encrypted data object and of an access number signal from any one of said terminals to said distribution unit via a key distribution channel and transmitting a key signal from the distribution unit to said one terminal which, in combination with the access number signal enables access to the data object signal,
   (d) coupling a distribution unit to said broadcast channel, said access number channel, and said key distribution channel, and adapting the distribution unit for
      i. generating an acess number signal $A_i$, where signal i is the index of the access number signal,
      ii. transmitting signal $A_i$ on said access number channel,
      iii. transforming a data object signal $m_j$ into an encrypted data object signal $c_j$, where signal j is the index of the data object signal, $$c_j = E_j(m_j),$$

and $E_j$ is a signal processing function,
      iv. transmitting signal $c_j$ on said broadcast channel,
      v. computing a key signal $t_{ij}$ such that $$m_j = D(A_i, t_{ij}, c_j),$$

where D is a signal processing function,
      vi. receiving signals representing index numbers i and j from said key distribution channel, and
      vii. transmitting signal $t_{ij}$ on said key distribution channel, and
   (e) coupling a plurality of terminals to said broadcast channel, said access number channel, and said key distribution channel, and adapting each terminal for
      i. receiving signal $c_j$ from said broadcast channel,
      ii. receiving signal $A_i$ from said access number channel,
      iii. transmitting signals i and j on said key distribution channel, and
      iv. transforming signal $c_j$ into a data object signal $m'_j$, where $$m'_j = D(A_i, t_{ij}, c_j).$$

50. The method as in claim 49 wherein signal $A_i$ represents an element of a group of signals,
   (a) the signal processing function $E_j$ is $$E_j(m_j) = f(B_j, m_j),$$

where $f$ is a signal processing function and $B_j$ represents an element of a group of signals, and
   (b) the signal processing function D is $$D(A_i, t_{ij}, c_j) = f'(A_i, c_j),$$

where $f'$ is a signal processing function and $A_i$ denotes the $t_{ij}$th power of signal $A_i$ in the group of signals.

51. The method as in claim 49 wherein signal $A_i$ represents an element of a group of signals, and
   (a) the signal processing function $E_j$ is $$E_j(m_j) = f(B_j, m_j)$$

where $f$ is a signal processing function, signal $B_j$ represents an element of a group of signals, and
   (b) the signal processing function D is $$D(A_i, t_{ij}, c_j) = f'(G \circ A_i, c_j)$$

where $f'$ is a signal processing function, G denotes the $t_{ij}$th power of G in the group of signals, G represents an element of the group of signals and o denotes a group signal processing operation.

52. The method as in claim 50 or 51 wherein the group of signals is a subgroup of order q of the multidimensional multiplicative group modulo n where n and q are integers, and hence where signals $A_i$ and $B_j$ represent vectors $\alpha_i$ and $\beta_j$, and the $t_{ij}$th power of $\alpha_i$ is
   $(a_{i1}{}^{t_{ij}} \bmod n, \ldots, \alpha_{im}{}^{t_{ij}} \bmod n)$, where $\alpha_{i1}, \ldots, \alpha_{im}$ are the components of $\alpha_i$ and m is the dimension.

53. The method as in claim 50 or 51 wherein the signal processing functions $f$ and $f'$ include bit-wise exclusive-or processing of signals.

54. The method as in claim 49, 50 or 51 wherein
   (a) the distribution unit
      i. transforms signal $t_{ij}$ into an encrypted key signal under a key-encryption key signal shorter than signal $t_{ij}$ and transmits said encrypted key signal on the access number channel, whereby the distribution unit may predistribute said encrypted key signal, and
      ii. transmits said key-encryption key signal on the key distribution channel, and
   (b) the terminal
      i. receives said encrypted key signal from the access number channel,
      ii. receives said key-encryption key signal from the key distribution channel, and
      iii. transforms said encrypted key signal into a key signal $t'_{ij}$ under said key-encryption key signal.

* * * * *

UNITED STATES PATENT AND TRADEMARK OFFICE
CERTIFICATE OF CORRECTION

PATENT NO. : 5,400,403  
DATED : MARCH 21, 1995  
INVENTOR(S) : Paul N. FAHN et al.

Page 1 of 2

It is certified that errors appear in the above-identified patent and that said letters patent is hereby corrected as shown below:

On the title page,
    item [75], Inventors:, at the end, delete "Paul N. Fahn, Redwood City, all of Calif."

Column 6, line 22, replace "$A_i$" with --$A_i$--;

, line 67, replace "$\beta = g^{s_j} \bmod n$" with --$\beta_j = g^{s_j} \bmod n$--.

Column 7, line 15, replace "$\alpha_i = g^{r_i} \bmod n$" with --$\alpha_i = g^{r_i} \bmod n$--.

Column 8, line 1, replace "$t_{ij}$ and $t_{ij}$," with --$t_{ij}$ and $t_{ij}$--;

, line 2, replace "$\delta_{ij} = t_{ij} - t_{ij} = s_j = s_j$." with --$\delta_{ij} = t_{ij} - t_{ij} = s_j - s_j$.--;

, line 37, replace "$t_{ij} = s_{j \cdot r_i} \bmod q$" with --$t_{ij} = s_j \cdot r_i \bmod q$--;

, line 39, replace "$\alpha_{i,k} = g_k r_i \bmod n$" with --$\alpha_{i,k} = g_k^{r_i} \bmod n$--;

, line 41, replace "$\beta_{j,k} = g_k s_j \bmod n$" with --$\beta_{j,k} = g_k^{s_j} \bmod n$--.

Column 10, line 29, replace "invovle" with --involve--.

Column 12, line 53 (Claim 17), should read --$D(A_i, t_{ij}, c_j) = f'([t_{ij}]A_i, c_j)$--;

, line 55, (Claim 17), replace "$A_i$" with --$[t_{ij}]A_i$--;

, line 67 (Claim 18), should read --$D(A_i, t_{ij}, c_j) = f'([t_{ij}]G \circ A_i, c_j)$--.

Column 13, line 1 (Claim 18), replace "G" with --$[t_{ij}]G$;--;

, line 10 (Claim 19), should read

--$(\alpha_{i,1}^{t_{ij}} \bmod n, \ldots, \alpha_{i,m}^{t_{ij}} \bmod n)$, where $\alpha_{i,1}, \ldots, \alpha_{i,m}$--.

Column 14, line 19, (Claim 23), should read --$D(A_i, t_{ij}, c_j) = f'([t_{ij}]A_i, c_j)$--;

, line 21, (Claim 23), replace "$A_i$" with --$[t_{ij}]A_i$--;

, line 33 (Claim 24), should read --$D(A_i, t_{ij}, c_j) = f'([t_{ij}]G \circ A_i, c_j)$--.

, line 35 (Claim 24), replace "G" with --$[t_{ij}]G$;--.

UNITED STATES PATENT AND TRADEMARK OFFICE
CERTIFICATE OF CORRECTION

PATENT NO. : 5,400,403
DATED : MARCH 21, 1995
INVENTOR(S) : Paul N. FAHN et al.

It is certified that errors appear in the above-identified patent and that said letters patent is hereby corrected as shown below:

Column 16, line 35 (Claim 44), should read --$D(A_i, t_{ij}, c_j) = f'([t_{ij}]A_i, c_j)$--;
, line 37 (Claim 44), replace "$f40$" with --$f'$-- and replace "$A_i$" with --$[t_{ij}]A_i$--;
, line 49 (Claim 45), should read --$D(A_i, t_{ij}, c_j) = f'([t_{ij}]G \circ A_i, c_j)$--;
, line 50, (Claim 45), replace "G" with --$[t_{ij}]G$;--;

Column 18, line 11 (Claim 50), should read -- --$D(A_i, t_{ij}, c_j) = f'([t_{ij}]A_i, c_j)$--;
, line 13 (Claim 50), replace "$A_i$" with --$[t_{ij}]A_i$--;
, line 24 (Claim 51), should read --$D(A_i, t_{ij}, c_j) = f'([t_{ij}]G \circ A_i, c_j)$--;
, line 26 (Claim 51) replace "G" with --$[t_{ij}]G$;--.

Signed and Sealed this

Fifteenth Day of October, 1996

Attest:

BRUCE LEHMAN

Attesting Officer          Commissioner of Patents and Trademarks